(12) United States Patent
Choi (10) Patent No.: US 7,969,651 B2
(45) Date of Patent: Jun. 28, 2011

(54) EDUCATIONAL STEREO MICROSCOPIC IMAGE DISPLAY APPARATUS

(76) Inventor: Hae-Yong Choi, Seoul (KR)

( * ) Notice: Subject to any disclaimer, the term of this patent is extended or adjusted under 35 U.S.C. 154(b) by 513 days.

(21) Appl. No.: 11/798,360

(22) Filed: May 14, 2007

(65) Prior Publication Data

US 2008/0088917 A1    Apr. 17, 2008

(30) Foreign Application Priority Data

Oct. 12, 2006  (KR) .................. 10-2006-0100149

(51) Int. Cl.
*G02B 21/36*    (2006.01)
(52) U.S. Cl. ........................................ 359/369
(58) Field of Classification Search .................. 359/369
See application file for complete search history.

(56) References Cited

U.S. PATENT DOCUMENTS

| | | | | |
|---|---|---|---|---|
| 2,518,240 A * | 8/1950 | Lowber et al. | .................. | 353/39 |
| 4,911,543 A * | 3/1990 | Hodgson | ....................... | 359/369 |
| 4,932,044 A * | 6/1990 | Williams et al. | ................ | 377/10 |
| 5,029,996 A * | 7/1991 | Carter | ............................ | 359/369 |
| 5,067,804 A * | 11/1991 | Kitajima et al. | ............... | 359/369 |
| 5,086,476 A * | 2/1992 | Bacus | ............................ | 382/133 |
| 5,134,662 A * | 7/1992 | Bacus et al. | ................... | 382/133 |
| RE35,409 E * | 12/1996 | Moore | ........................... | 382/276 |
| 5,694,242 A * | 12/1997 | Omi | .............................. | 359/369 |
| 6,252,704 B1 * | 6/2001 | Omi | .............................. | 359/391 |
| 6,721,094 B1 * | 4/2004 | Sinclair et al. | ................ | 359/386 |
| 6,741,391 B1 * | 5/2004 | Ishihara et al. | ............... | 359/372 |
| 7,542,596 B2 * | 6/2009 | Bacus et al. | ................... | 382/128 |

* cited by examiner

*Primary Examiner* — Stephone B Allen
*Assistant Examiner* — Derek S Chapel
(74) *Attorney, Agent, or Firm* — Bacon & Thomas, PLLC (57) ABSTRACT

An educational stereo microscopic image display apparatus includes a bag-shaped main box, a planar screen panel which is provided at a front portion of the main box and has a size of 20 inches to 40 inches, and a microscopic image optical system which is provided at a rear portion of the main box and has an objective lens and an image conversion device which converts an optical signal into an electric signal. An image of an object to be inspected is magnified by the microscopic image optical system, and the magnified image is displayed on the large-scale planar screen panel. Accordingly, a teacher and a large number of students (up to about one hundred) can conveniently observe the image of the object to be inspected at the same time.

6 Claims, 11 Drawing Sheets

EDUCATIONAL STEREO MICROSCOPIC IMAGE DISPLAY APPARATUS

BACKGROUND OF THE INVENTION

1. Field of the Invention

The present invention relates to an educational stereo microscopic image display apparatus which makes very small objects look bigger and displays a magnified microscopic image through a large-scale planar display device so that many people can observe the magnified microscopic image at the same time, mainly for the purpose of education. More particularly, the present invention relates to an educational stereo microscopic image display apparatus which is equipped with a microscopic image optical system having a structure of coupling an objective lens to an image conversion device (e.g., charge coupled device (CCD)) which converts an optical signal into an electric signal, and a large-scale planar display device to which the microscopic image optical system is mounted in an integral manner so as to be carried together, the planar display device displaying a microscopic image magnified by the microscopic image optical system to all of the students.

2. Description of the Related Art

A typical educational stereo microscope is used personally. So, stereo microscopes are necessary as many as the number of students.

For example, in order to educate thirty students, thirty microscopes are needed, and an additional classroom specialized for installing the microscopes is needed. Also, because a microscopic image inspected through a teacher's microscope is different from microscopic images inspected through respective student's microscopes, there is inconvenience in education.

Further, there is no effective educational stereo microscopic image display apparatus which can show appearances of insect wings, rock particles, mineral particles, flower pistils, flower stamens, etc. to all of the students at the same time and measure sizes of the objects to be inspected.

SUMMARY OF THE INVENTION

Therefore, the present invention has been made in view of the above problems, and it is an object of the present invention to provide an educational stereo microscopic image display apparatus which can display a magnified image of an object to be inspected through a large-scale screen, so that a teacher and all students in a classroom can observe the image of the object to be inspected at the same time.

It is another object of the present invention to provide an educational stereo microscopic image display apparatus which enables a teacher and students to inspect a shape or motion of an object to be inspected more accurately and to measure a size of an object to be inspected.

It is yet another object of the present invention to provide an educational stereo microscopic image display apparatus which is equipped with a planar screen panel so that students can observe an image thereon, and a microscopic image optical system which is mounted to a rear portion of the planar screen panel so as to be carried together and so that a teacher can manipulate the microscopic image optical system while looking at the students.

In accordance with the present invention, the above and other objects can be accomplished by the provision of an educational stereo microscopic image display apparatus comprising: a main box which forms an outer appearance; a planar screen panel which is provided at a front portion of the main box; and a microscopic image optical system which is provided at the main box, the microscopic image optical system having an objective lens and an image conversion device. An image of an object to be inspected is magnified by the microscopic image optical system, and the magnified image is displayed on the planar screen panel.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings.

Figure 1:
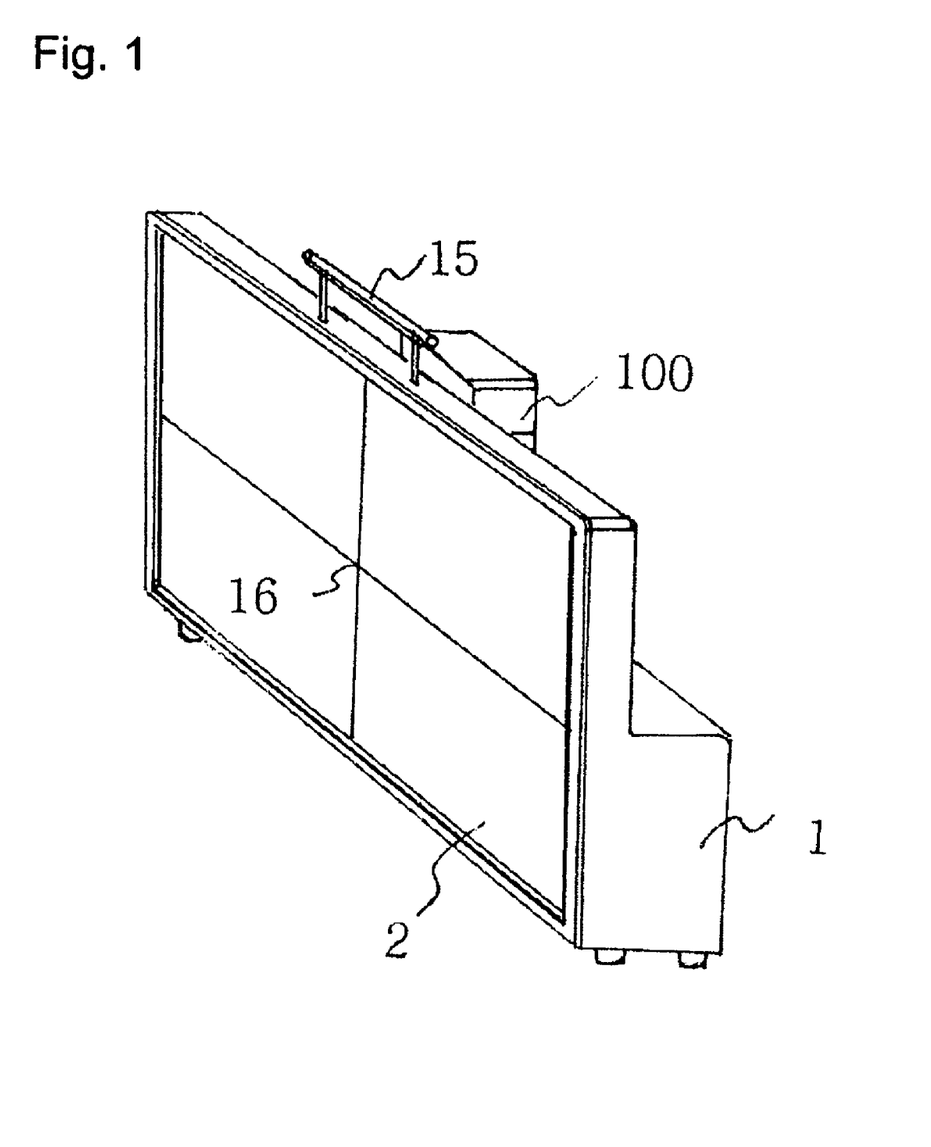
FIG. 1 is a front perspective view illustrating an educational stereo microscopic image display apparatus in accordance with the present invention.
Figure 2:
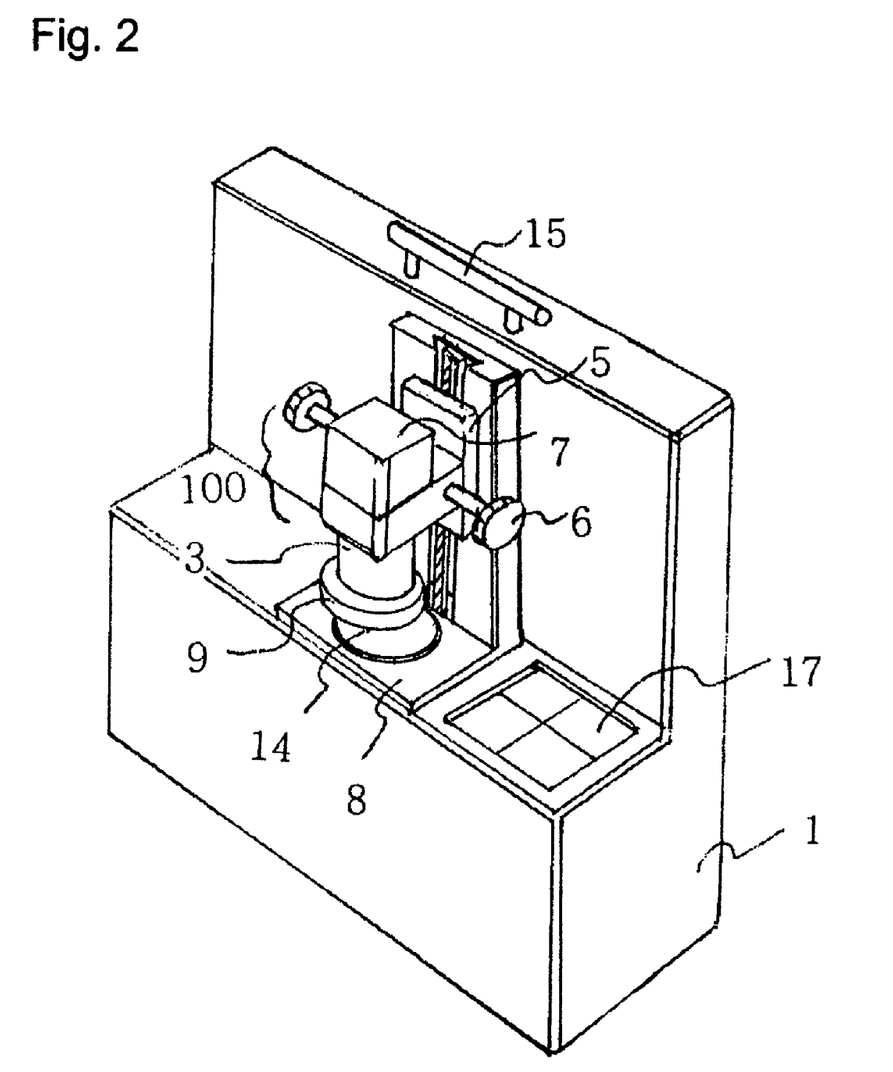
FIG. 2 is a rear perspective view illustrating an educational stereo microscopic image display apparatus in accordance with the present invention.
Figure 3A:
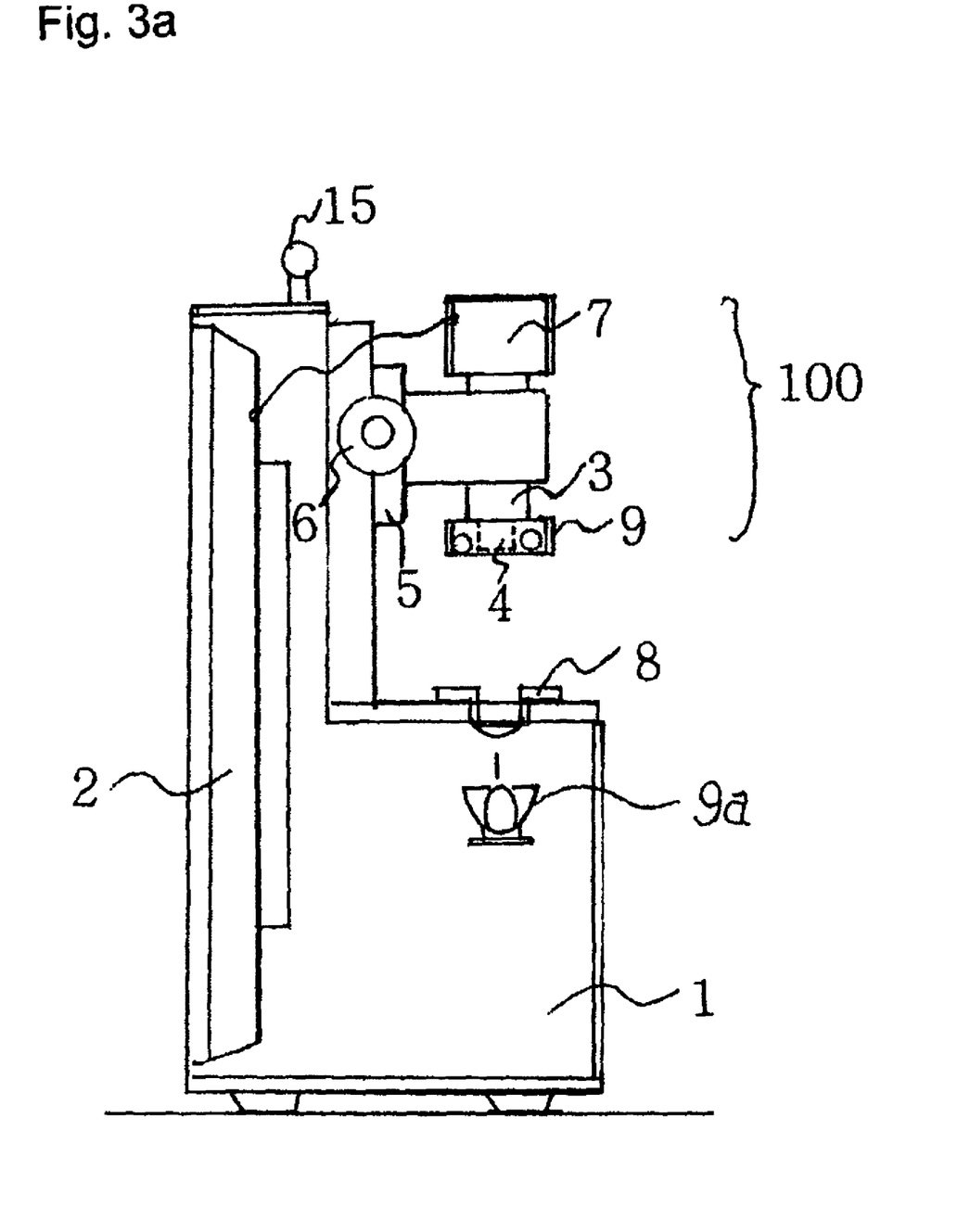
FIG. 3a is a sectional view illustrating an educational stereo microscopic image display apparatus in accordance with the present invention.
Figure 3B:
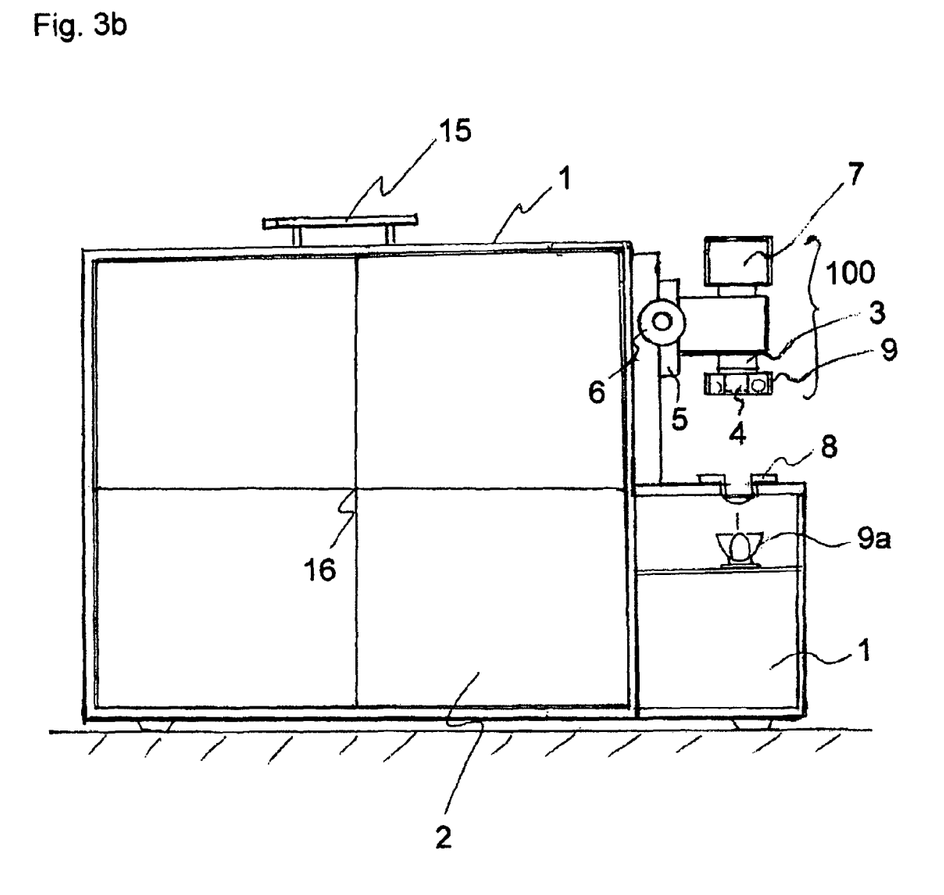
FIG. 3b is a front view illustrating a modification of an educational stereo microscopic image display apparatus in accordance with the present invention.
Figure 3C:
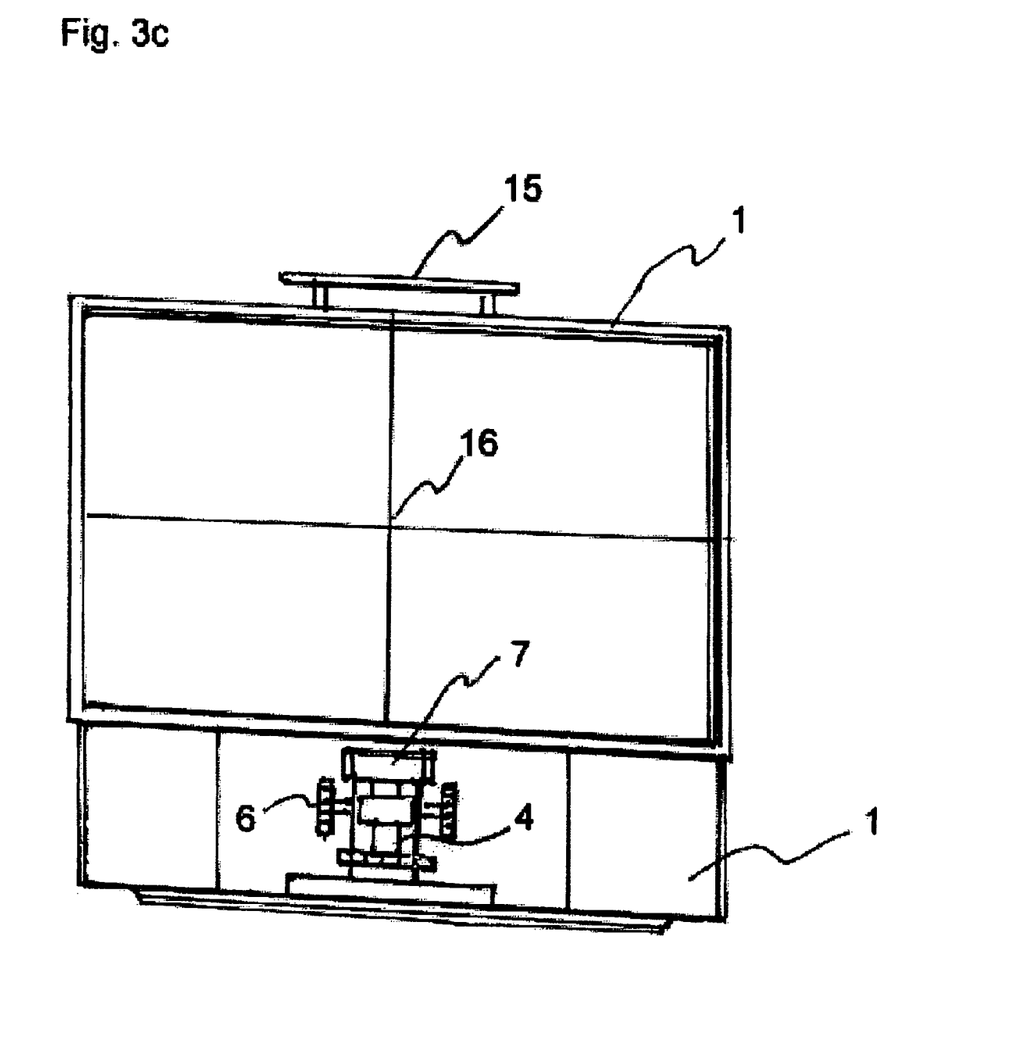
FIG. 3c is a front view illustrating another modification of an educational stereo microscopic image display apparatus in accordance with the present invention.

As shown in FIGS. 1 to 3, an educational stereo microscopic image display apparatus according to the present invention includes a bag-shaped main box 1, having a handle 15, and which forms an outer appearance, a planar screen panel 2 which is provided at a front portion of the main box 1, and a microscopic image optical system 100 which is provided at a rear portion of the main box 1.

The planar screen panel 2 is configured as a display device such as a plasma display panel (PDP), a liquid crystal display (LCD), a projection system or the like. Preferably, the planar screen panel 2 has a size of 12 inches to 60 inches, more preferably, 20 inches to 40 inches, which is adequate for portability.

Figure 4A:
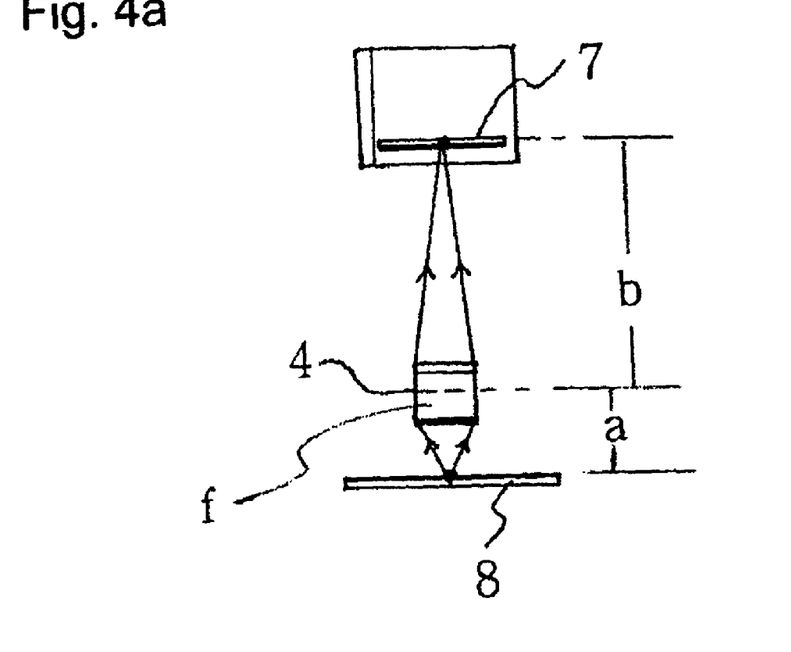
FIG. 4a is a schematic view illustrating a structure of an objective lens of a microscopic image optical system.
Figure 4B:
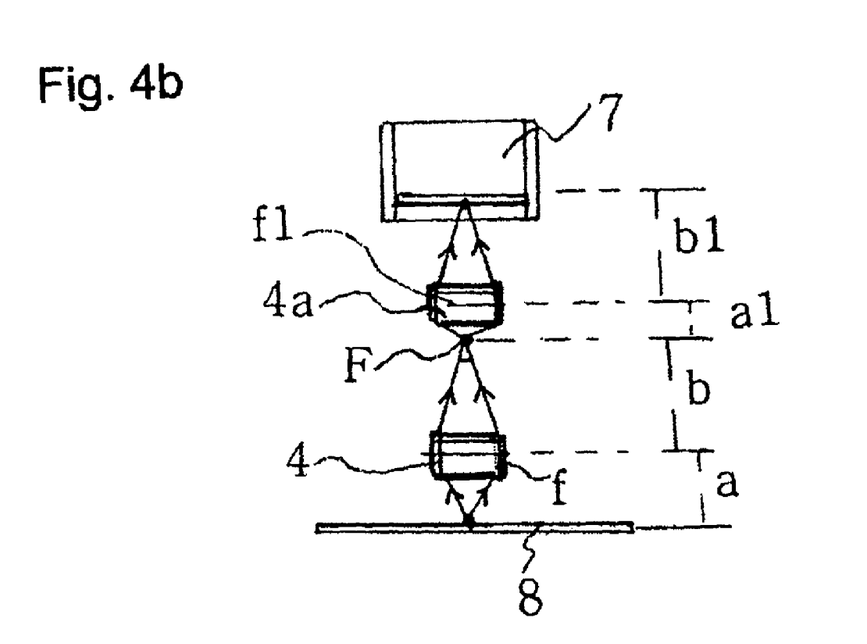
FIG. 4b is a schematic view illustrating a structure of a magnifying lens of a microscopic image optical system.

As shown in FIGS. 4a and 4b, the microscopic image optical system 100 includes an objective lens 4 serving as a projection lens, and an image conversion device 7 which converts an optical signal into an electric signal, such as a charge coupled device (CCD) or a complementary metal-oxide semiconductor (CMOS).

A lens case 3 is disposed under the image conversion device 7, and contains the objective lens 4 (see FIG. 4a) or contains a magnifying lens 4a as well as the objective lens 4 (see FIG. 4b).

Preferably, the objective lens 4 is configured as a projection lens structure having a relatively short focal length f of 1 mm to 50 mm.

If the focal length f of the objective lens 4 is too short, less than 1 mm, an inspection range of the objective lens 4 is very narrow. On the other hand, if the focal length f of the objective lens 4 is larger than 50 mm, a magnification ratio is very low.

Referring to FIGS. 4a and 4b, an image magnification ratio is a ratio of a distance b between the objective lens 4 and the image conversion device 7 to a distance a between the objective lens 4 and a stage 8.

The focal length f of the objective lens 4, the distance a between the objective lens 4 and the stage 8, and the distance b between the objective lens 4 and the image conversion device 7 have the following relationship.

$$1/a + 1/b = 1/f$$

For example, if the focal length f of the objective lens 4 is 10 mm and the distance b between the objective lens 4 and the image conversion device 7 is 100 mm, the distance a between the objective lens 4 and the stage 8 becomes 11.1 mm (1/a=1/10−1/100). Accordingly, since a ratio of b to a is 100 mm to 11.1 mm, the magnification ratio becomes about 9.

In the same manner, if the focal length f of the objective lens 4 is 5 mm and the distance b between the objective lens 4 and the image conversion device 7 is 100 mm, the distance a between the objective lens 4 and the stage 8 becomes 5.26 mm. Accordingly, since a ratio of b to a is 100 mm to 5.26 mm, the magnification ratio becomes about 19.

In the same manner, if the focal length f is 1.5 mm and the distance b is 100 mm, the distance a becomes 1.523 mm. Accordingly, since a ratio of b to a is 100 mm to 1.523 mm, the magnification ratio becomes about 65.

In this case, the image magnification ratio can be increased by using the magnifying lens 4a.

As shown in FIG. 4b, the microscopic image optical system 100 may further include the magnifying lens 4a above the objective lens 4, so as to increase the image magnification ratio.

The image magnified by the objective lens 4 is further magnified by the magnifying lens 4a, and formed on the image conversion device 7.

In FIG. 4b, a1 refers to a distance between the magnifying lens 4a and a focal point F of the objective lens 4, and b1 refers to a distance between the magnifying lens 4a and the image conversion device 7.

A process of deriving the magnification ratio of the magnifying lens 4a is the same as the process of deriving the magnification ratio of the objective lens 4.

In other words, the distance a1 is substituted for the distance a in FIG. 4a, and the distance b1 is substituted for the distance b in FIG. 4a.

It is preferable to use the magnifying lens 4a having a focal length f1 of 2 mm to 20 mm and the magnification ratio of 10 to 20.

Accordingly, the image magnification ratio can be determined in the range of 10 to 100 by adjusting the distance b, selecting the value of the focal length f from 1.5 mm to 50 mm, or adding the magnifying lens 4a.

The image of the object magnified by the objective lens 4 or the magnifying lens 4a is formed on the image conversion device 7, and is converted into an electric signal by an already-known electronic circuit combined with the image conversion device 7, to be displayed on the planar screen panel 2.

A zoom lens may be additionally provided between the objective lens 4 and the magnifying lens 4a.

Figure 5:
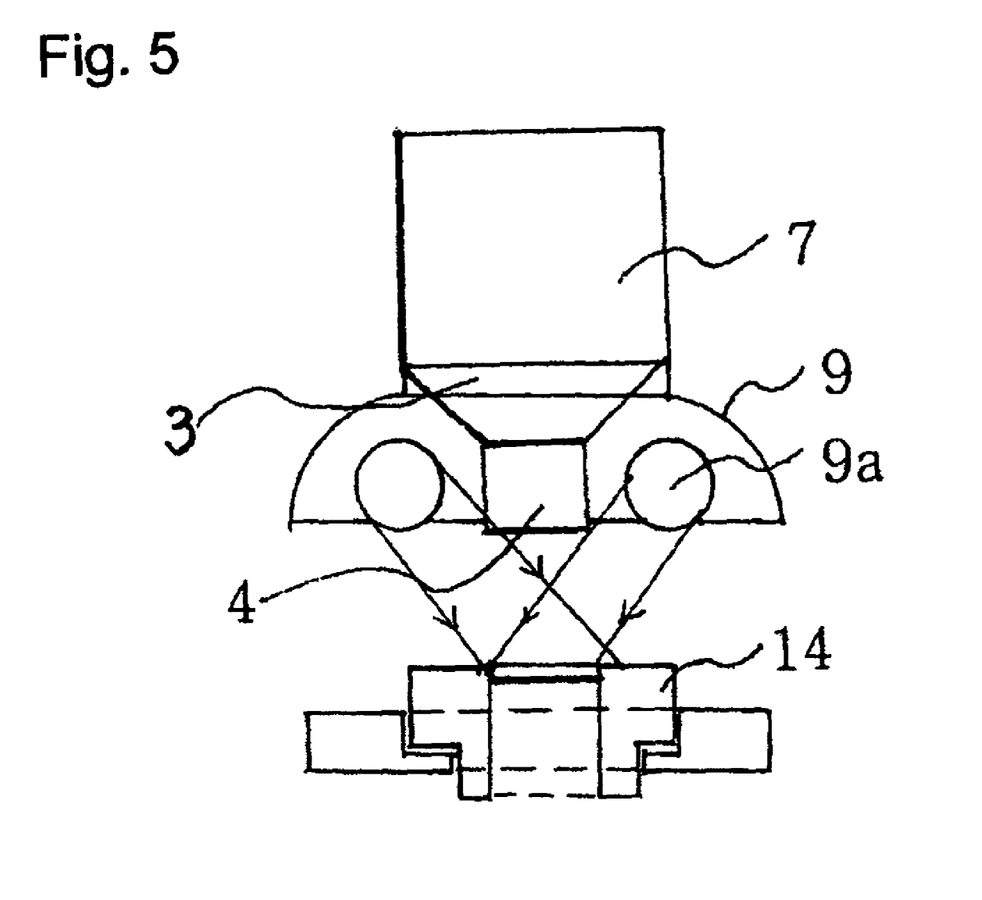
FIG. 5 is a schematic view illustrating an illumination device of an objective lens.

Also, as shown in FIG. 5, an illumination device 9 is provided near the lens case 3 equipped with the objective lens 4.

Preferably, a lamp 9a of the illumination device 9 is configured as a light emitting diode (LED) or a fluorescent lamp. The illumination device 9 irradiates light to an object to be inspected which is provided below the objective lens 4, so that the image of the object to be inspected is projected to the objective lens 4.

Figure 7:
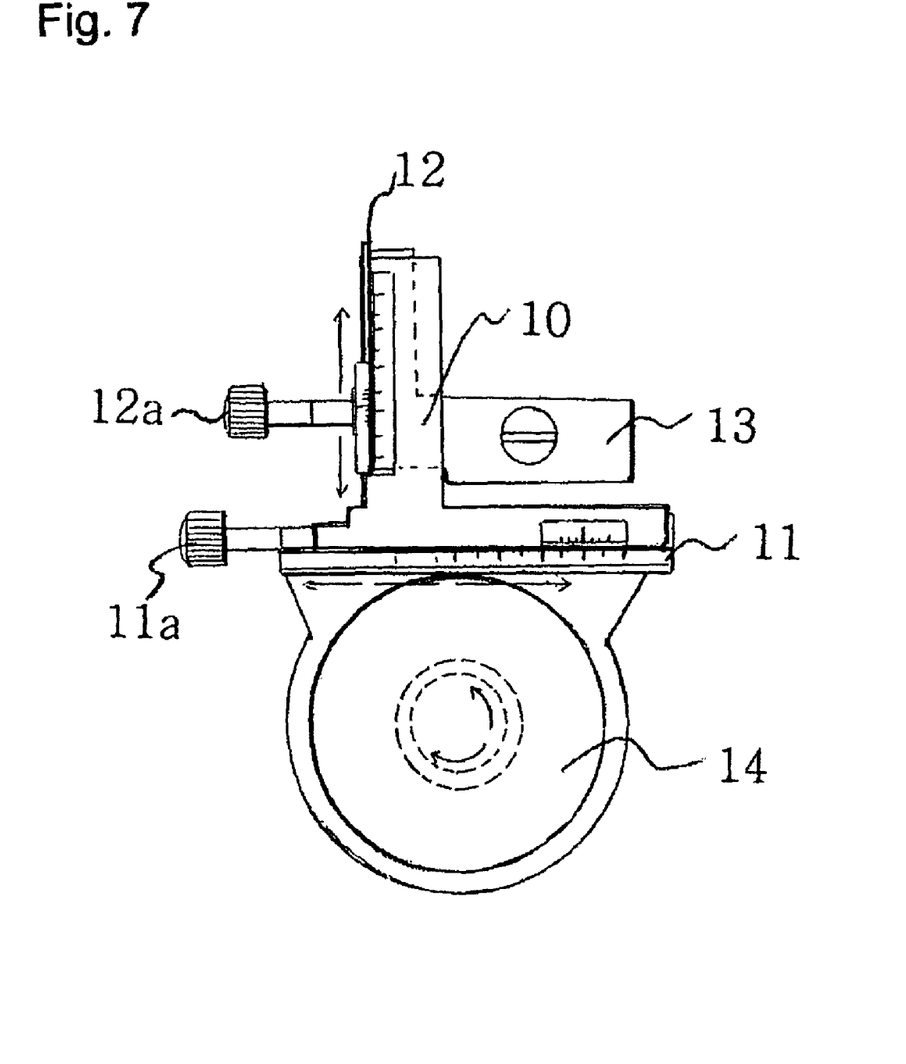
FIG. 7 is a schematic view illustrating a structure of coupling a moving device to a rotation stage.

Also, as shown in FIGS. 5 and 7, the stage 8 on which the object to be inspected is loaded may be configured as a rotation stage 14 which can be rotated by 360°.

As shown in FIG. 3a, a lamp 9a may be additionally provided inside the main box 1 under the rotation stage 14 so as to illuminate the object to be inspected from the bottom.

FIG. 7 is a plan view illustrating a structure of coupling a moving device 10 to the rotation stage 14.

Figure 8:
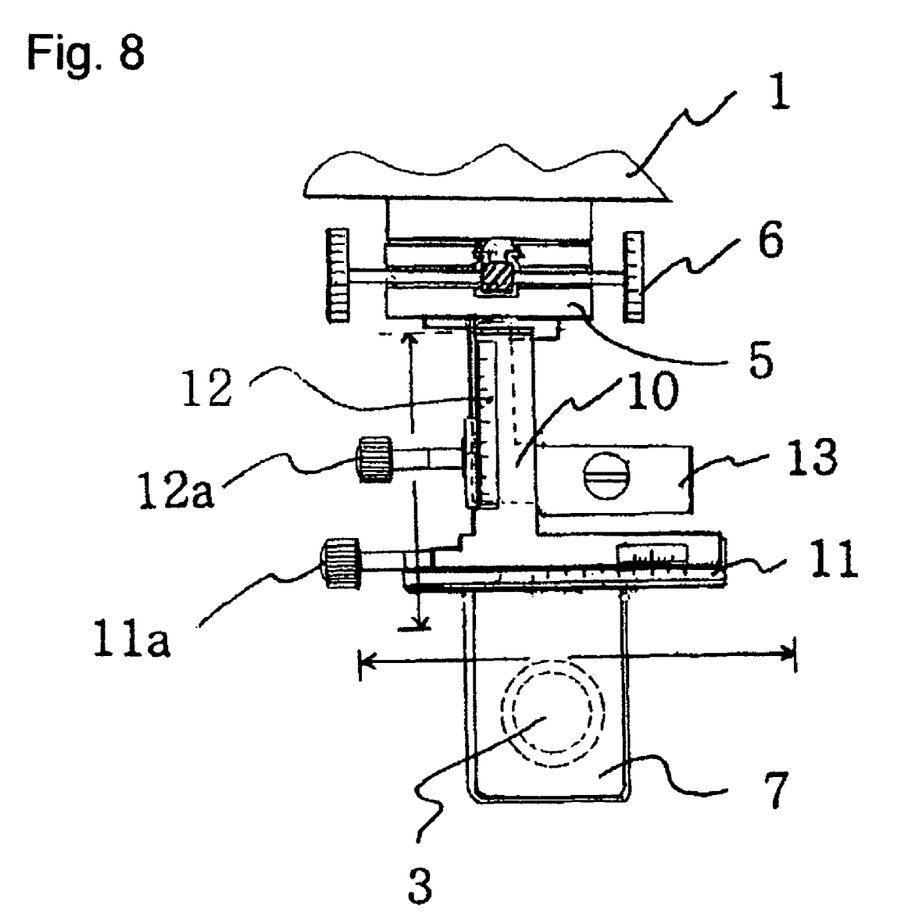
FIG. 8 is a schematic view illustrating a structure of coupling a moving device to a microscopic image optical system.

FIG. 8 is a plan view illustrating a structure of coupling the assembly of the moving device 10 and the microscopic image optical system 100 to an up/down moving block 5.

The moving device 10 shown in FIGS. 7 and 8 is for moving the object to be inspected in front/rear and left/right directions. The structure of the moving device 10 may be diversely modified.

Referring to FIGS. 7 and 8, the moving device 10 includes a front/rear moving device 12 for moving the object to be inspected in the front/rear direction, and a left/right moving device 11 for moving the object to be inspected in the left/right direction. The front/rear moving device 12 includes a high precision screw rod (not shown) and a front/rear moving handle 12a coupled to an end of the screw rod. Identically, the left/right moving device 11 includes a high precision screw rod (not shown) and a left/right moving handle 11a coupled to an end of the screw rod.

If rotating the front/rear moving handle 12a, by the rotational operation of the screw rod, the front/rear moving device 12 moves forward and backward. Accordingly, the left/right moving device 11 connected to the front/rear moving device 12, and the rotation stage 14 connected to the left/right moving device 11 (see FIG. 7) or the microscopic image optical system 100 connected to the left/right moving device 11 (see FIG. 8) are also moved forward and backward.

If rotating the left/right moving handle 11a, by the rotational operation of the screw rod, the rotation stage 14 connected to the left/right moving device 11 (see FIG. 7) or the microscopic image optical system 100 connected to the left/right moving device 11 (see FIG. 8) is moved leftward and rightward.

In other words, the rotation stage 14 is coupled to the left/right moving device 11, the assembly of the rotation stage 14 and the left/right moving device 11 is coupled to the front/rear moving device 12.

The moving device 10 is directly connected to the microscopic image optical system 100, and connected to the up/down moving block 5 through a moving device supporting block 13.

Hereinafter, a method for measuring the size of the magnified image of the object to be inspected will be described.

Figure 6:
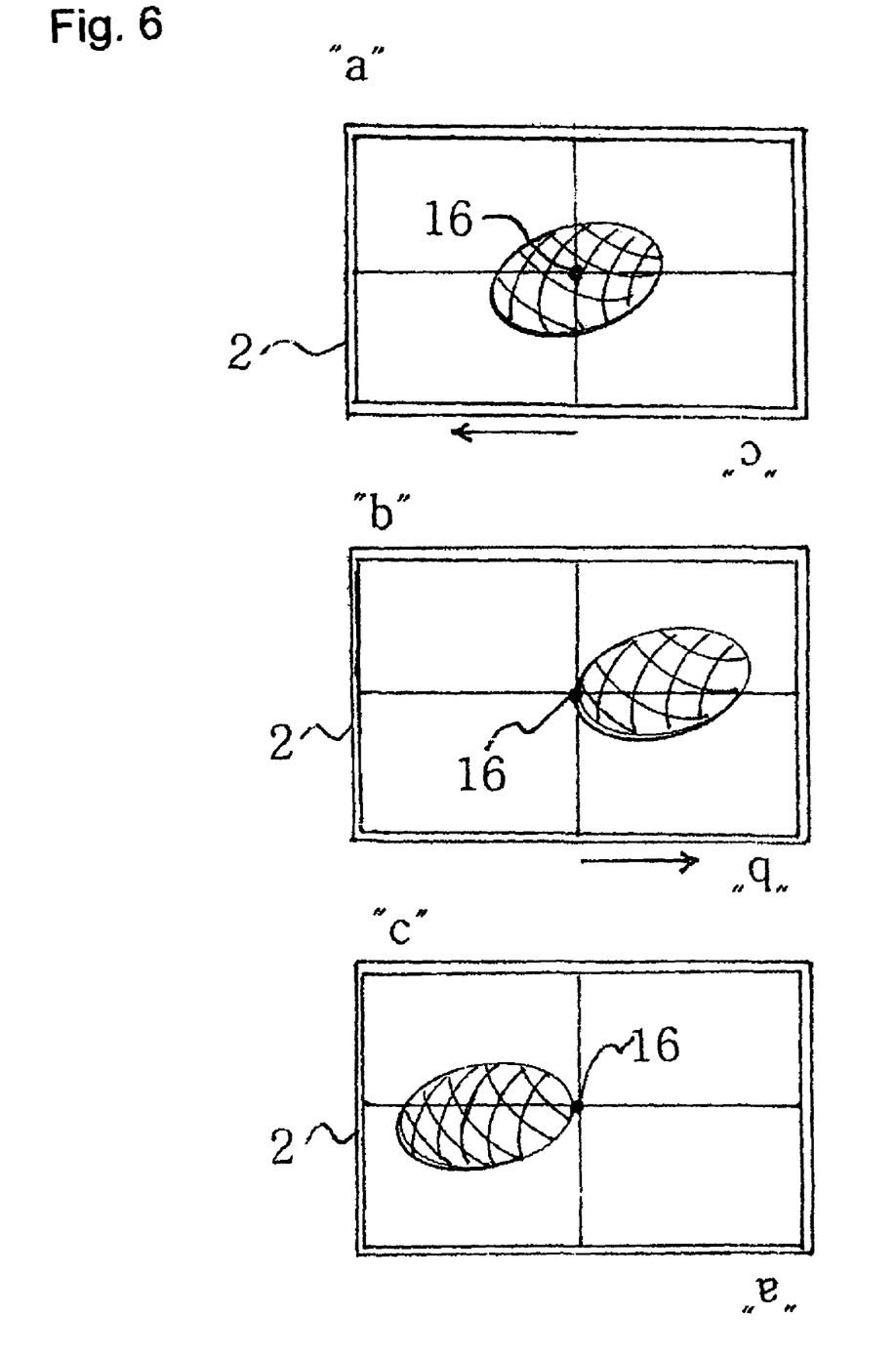
FIG. 6 is a schematic view illustrating a method for measuring a size of an object to be inspected.

As shown in FIGS. 1 and 6, reference lines 16 are formed on the planar screen panel 2 to measure the size of the magnified image of the object to be inspected.

The reference lines 16 may be directly marked on the planar screen panel 2 itself.

Alternatively, a transparent plate on which the reference lines are marked may be disposed at the focal point F of the objective lens 4 (see FIG. 4b). In this case, the magnified image of the object to be inspected through the objective lens 4 and the magnifying lens 4a and the reference lines of the transparent plate are displayed together on the planar screen panel 2.

Referring to FIGS. 6a, 6b and 6c, when inspecting an eye of a butterfly and measuring the size of the eye, for example, a butterfly is first loaded on the rotation stage 14. The up/down moving block 5 is moved up and down by rotating a moving handle 6 (see FIG. 2), so as to adjust the focus. The eye of the butterfly to be inspected is magnified (see FIG. 6a), and a point of the eye is set to a certain reference point on the reference lines 16 (see FIG. 6b). Then, by rotating the left/right moving handle 11a of the left/right moving device 11, the microscopic image optical system 100 is moved as shown in FIG. 6c. The moving distance is measured and displayed by a measuring device, e.g., a micro gauge, so that the width of the eye of the butterfly can be measured.

In the same manner, if rotating the front/rear moving handle 12a, the length of the object to be inspected in the front/rear direction is measured. If rotating the rotation stage 14, the length of the object to be inspected in the user-desired direction is measured.

As shown in FIG. 8, the moving device 10 coupled to the microscopic image optical system 100 is connected to the up/down moving block 5.

Accordingly, the whole assembly of the microscopic image optical system 100, the front/rear moving device 12 and the left/right moving device 11, which is connected to the up/down moving block 5, is moved up and down by rotating the moving handle 6, so as to adjust the focus. Afterwards, the eye of the butterfly to be inspected is magnified (see FIG. 6a), and a point of the eye is set to a certain reference point on the reference lines 16 (see FIG. 6b). Then, by rotating the left/right moving handle 11 a of the left/right moving device 11, the microscopic image optical system 100 is moved as shown in FIG. 6c. The moving distance is measured and displayed by a micro gauge, so that the width of the eye of the butterfly can be measured.

There is no difference between the structure of coupling the moving device 10 to the stage 8 and the structure of coupling the moving device 10 to the microscopic image optical system 100, except whether to move the stage 8 or the microscopic image optical system 100 in the front/rear and left/right directions. The above structures both have the same operational effects.

In this embodiment, the microscopic image optical system 100 is disposed above the main box 1. However, the microscopic image optical system 100 may be disposed inside the main box 1 as needed.

Also, the microscopic image optical system 100 may be separated from the main box 1 as needed, so as to conveniently inspect the object.

For instance, the microscopic image optical system 100 is demounted from the main box 1 and brought to a flowerpot to inspect pistils and stamens of flowers in the flowerpot. After the inspection, the microscopic image optical system 100 can be remounted to the main box 1.

For this, an additional bracket for permitting the microscopic image optical system 100 to be demounted and remounted from/to the main box 1 may be provided.

Further, as shown in FIG. 2, a monitor 17 may be additionally provided at a rear portion of the main box 1, so that a teacher can observe the same image of the object to be inspected through the monitor 17 as that displayed on the planar screen panel 2 to students.

Also, as shown in FIG. 3b, the structure of the educational stereo microscopic image display apparatus of the present invention may be modified such that the microscopic image optical system 100 having the objective lens 4 and the image conversion device 7 is mounted to either a left side portion or a right side portion of the main box 1. Also, as shown in FIG. 3c, the microscopic image optical system 100 having the objective lens 4 and the image conversion device 7 may be mounted below the main box 1. Such a structural modification permits the teacher to manipulate the microscopic image optical system 100 while observing the image displayed on the planar screen panel 2 and looking at the students. In this case, the additional monitor 17 (see FIG. 2) is unnecessary.

Figure 9:
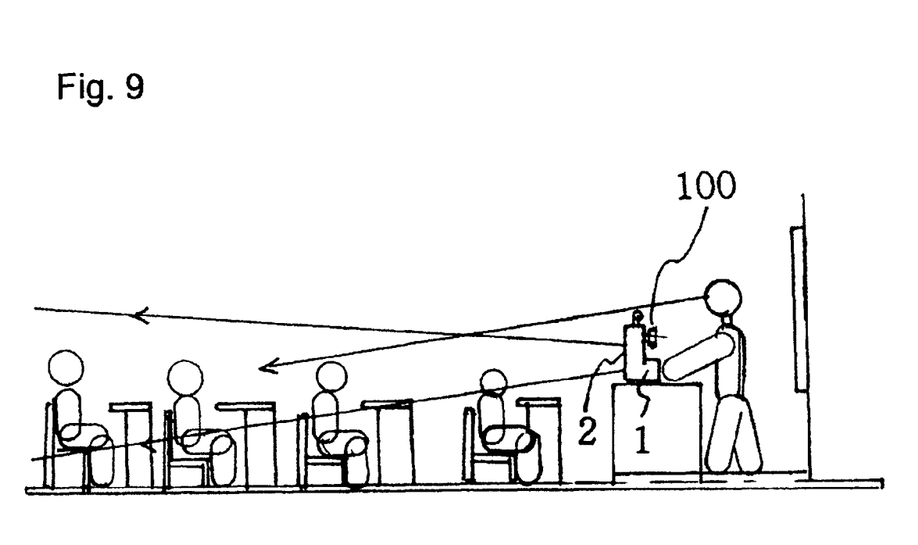
FIG. 9 is a schematic view illustrating a state of using an educational stereo microscopic image display apparatus in accordance with the present invention in a classroom.

As apparent from the above description, the educational stereo microscopic image display apparatus according to the present invention can display the magnified image of the object to be inspected through the planar screen panel, so that a teacher and all students in a classroom can conveniently observe the image of the object to be inspected at the same time (refer to FIG. 9). Accordingly, it is unnecessary to prepare the conventional microscopes as many as the number of students and a classroom specialized for installing the microscopes.

Also, since the planar screen panel and the microscopic image optical system are integrally mounted to the bag-shaped main box, a teacher can easily carry the educational stereo microscopic image display apparatus to desired locations via the handle.

Also, since the front/rear moving device and the left/right moving device are coupled to the stage or the microscopic image optical system, the more detailed inspection of motion of insects or rock particles is possible, thereby further increasing an educational effect.

Further, the educational stereo microscopic image display apparatus according to the present invention can display the magnified image of the object to be inspected through the large-scale planar screen panel having a size of 20 inches to 40 inches (which is about forty times to four-hundred times as large as a viewing area of 1 inch to 2 inches when a user inspects an object through an eyepiece lens of a conventional microscope), so that a large number of students (up to about one hundred) can observe the magnified image of the object to be inspected at the same time, thereby further increasing an educational effect.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An educational stereo microscopic image display apparatus for magnifying and observing objects comprising:
   a main box which forms an outer appearance;
   an integrally mounted first planar screen panel covering a substantial entirety of a front side of the main box in the form of a plasma display panel (PDP) or a liquid crystal display (LCD);
   an integrally mounted second planar screen panel provided at a rear portion of the main box, so that an operator of the apparatus can observe the same image that is displayed on the first planar screen panel; and
   a microscopic image optical system which is provided at the rear portion of the main box, the microscopic image optical system having a stage, an objective lens, and an image conversion device, and a magnifying lens provided between the objective lens and the image conversion device, wherein the objective lens is configured as a projection lens structure having a focal length of 1 mm to 50 mm, and an image of the objective lens is formed on the image conversion device, and wherein an image of the object to be observed is magnified by 10 to 100 times and is formed on the first planar screen panel such that several persons can simultaneously view the image using one main box.

2. The educational stereo microscopic image display apparatus according to claim 1, further comprising:

an illumination device which is provided near the objective lens to irradiate light to an object to be observed.

3. The educational stereo microscopic image display apparatus according to claim 1, further comprising:

a moving device which is coupled to the stage to move the stage in front, rear, left and right directions.

4. The educational stereo microscopic image display apparatus according to claim 1, wherein the microscope image optical system can be demounted from and remounted to the first and second planar screen panels.

5. The educational stereo microscopic image display apparatus according to claim 1, wherein micro-gauges are provided on left and right, and front and rear parts of the stage, respectively, and a reference line is formed on at least one of the first and second planar screen panels to measure the size of the magnified image of the object to be observed by a movement distance of the stage relative to the reference line.

6. The educational stereo microscopic image display apparatus according to claim 1, wherein the first planar screen panel has a size of 12 inches to 60 inches.

* * * * *